United States Patent [19]
Simon et al.

[11] Patent Number: 5,676,207
[45] Date of Patent: Oct. 14, 1997

[54] SOIL VAPOR EXTRACTION SYSTEM

[76] Inventors: Philip B. Simon, 2517 Pamela, Ann Arbor, Mich. 48103; James Braithwaite, 3449 E. Pine View Dr., Dexter, Mich. 48130

[21] Appl. No.: 650,159

[22] Filed: May 20, 1996

[51] Int. Cl.$^6$ ............................ E21B 43/30; E21B 43/40; B09C 1/00
[52] U.S. Cl. .............................. 166/268; 166/50; 166/52; 166/266; 210/DIG. 49; 405/128
[58] Field of Search ......................... 166/50, 52, 266, 166/268, 369; 210/747; 405/128

[56] References Cited

U.S. PATENT DOCUMENTS

| | | | |
|---|---|---|---|
| Re. 33,102 | 10/1989 | Visser et al. | 166/267 |
| 4,593,760 | 6/1986 | Visser et al. | 166/267 |
| 4,815,892 | 3/1989 | Martin | 405/128 X |
| 4,849,360 | 7/1989 | Norris et al. | 405/128 X |
| 4,945,988 | 8/1990 | Payne et al. | 166/268 X |
| 5,106,232 | 4/1992 | Metzer et al. | 405/128 |
| 5,161,914 | 11/1992 | Rahn et al. | 405/128 |
| 5,181,796 | 1/1993 | De Young | 405/128 |
| 5,252,226 | 10/1993 | Justice | 210/747 X |
| 5,279,740 | 1/1994 | Basile et al. | 210/747 X |
| 5,346,330 | 9/1994 | Bernhardt | 210/747 X |
| 5,402,848 | 4/1995 | Kelly | 166/266 |
| 5,525,008 | 6/1996 | Wilson | 405/128 |
| 5,584,605 | 12/1996 | Beard et al. | 166/50 X |

*Primary Examiner*—George A. Suchfield
*Attorney, Agent, or Firm*—Howard & Howard

[57] ABSTRACT

A soil remediation system (10) for removing contaminants (11) from a contaminated area (12) located in the vadose zone (13) of the earth and comprising multiplicity of stratigraphic zones, contaminants and compositions (26, 28), is disclosed. The system (10) comprises a first circulator (32) for circulating gas through the first zone (26) at a first volumetric rate and a second circulator (38) for circulating gas through the second zone (28) at a second volumetric rate to carry the contaminants in each respective zone (26, 28) to the surface of the earth (15). The system (10) includes a zero or low permeability membrane or layer (34) positioned between the first and second zone (26, 28) to control the commingling of the first and second volumetric flow rates so as to allow removal of contaminates in the first zone (26) independent of the removal of contaminates in the second zone (28).

6 Claims, 4 Drawing Sheets

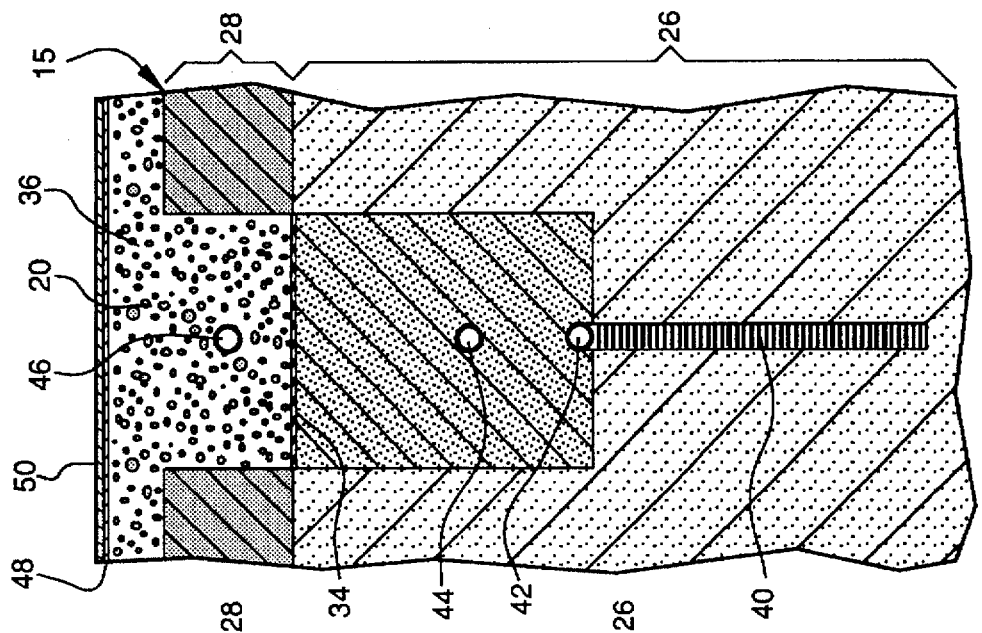
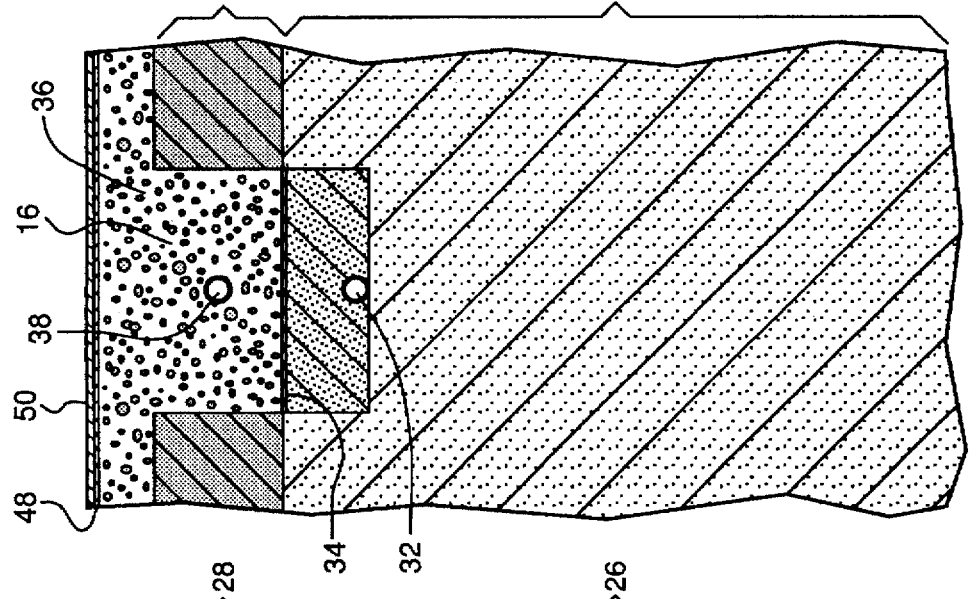
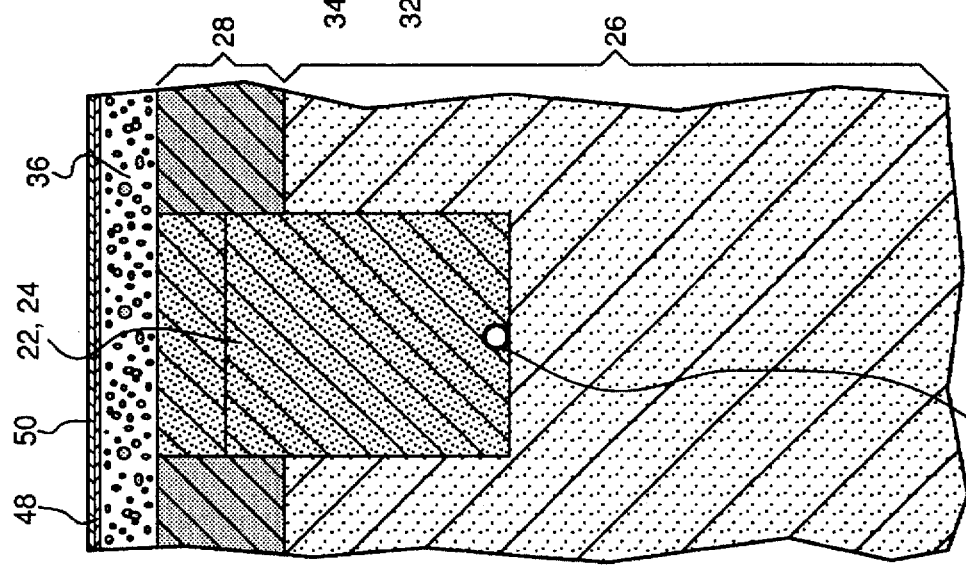

1

SOIL VAPOR EXTRACTION SYSTEM

TECHNICAL FIELD

The subject invention relates to systems for the remediation of contaminated soil located in the vadose zone of the earth.

BACKGROUND ART

Traditionally, contaminates have been removed from soil by excavating the contaminated subsurface material, neutralizing the excavated contaminates and thereafter disposing them. More recently, in-situ soil vacuum extraction systems have been developed to avoid the need for costly excavation. An example of such a in-situ soil vacuum extraction system (ISVE) can be found in U.S. Pat. No. 5,161,914. The design and operation of ISVE remediation systems are based on the movement of gases in the porous medium. The contaminants are subjected to a suitable vacuum or airflow to disturb the equilibrium of the contaminants, according to applicable partition coefficients and/or Henry's law. In this manner, migration of the contaminants is induced so that contaminants can be collected and neutralized. U.S. Pat. No. 4,593,760 and Reissue Pat. No. 33,102, both issued to Visser et at., describe an ISVE remediation system for removing contaminants from the earth's vadose zone. These patents disclose wells which are sunk vertically into the vadose zone and a well casing placed within the wells. The well casing includes a lower perforated region. A vacuum is applied to the well casing to draw the contaminants located in the vadose zone into the well casing and to the surface of the earth for treatment.

An ISVE remediation system must be designed in accordance with site specific subsurface conditions in order to maximize the volumetric rate of contaminant removal. Such subsurface conditions include the pneumatic conductivity, porosity, or permeability of the subsurface material as well as the vapor pressures of the various contaminants lodged within the subsurface material. Practically speaking, there is a tradeoff between the volumetric rate of contaminant removal and the cost of energy consumed to create the circulation, airflow, or vacuum needed to induce migration of the contaminants by disturbing the vapor pressure equilibrium state of the contaminants. It is well known that soil type or contaminant type directly influences the volumetric rate of contaminant removal and the corresponding airflow or vacuum needed. To date the prior art has not dealt with the problem of creating the most efficient in-situ soil vacuum extraction system. In other words, the prior art has not developed such a system which can account for soil type variances and/or contaminant type variances between different layers of subsurface material. The current prior art only teaches using one flow rate throughout the vadose zone even if the vadose zone consists of two or more soil make-ups having large differences in pneumatic conductivity and/or two or more contaminants types and/or differences in contaminant concentrations located at different subsurface layers and/or depths.

SUMMARY OF THE INVENTION AND ADVANTAGES

The present invention is a method for removing contaminates from a contaminated area of the earth located in the vadose zone between the surface of the earth and the subsurface water table and comprising a first zone having a first composition and/or contaminant type or concentration, and a second zone adjacent to the first zone and having a second composition and/or contaminant type or concentration different from the first zone. The method comprised the steps of circulating gas through the first zone at a first volumetric flow rate, circulating gas through the second zone at a second volumetric flow rate and isolating the first zone from the second zone to prevent the commingling of the first and second volumetric flow rates so as to allow the removal of contaminates in the first zone independent of the removal of contaminates in the second zone.

The primary advantage of the present invention is greater energy and entropy efficiency in the removal of contaminants located in the earth's vadose zone.

Another advantage of the present invention is more effective and precise removal of contaminates located in the earth's vadose zone.

FIGURES IN THE DRAWINGS

FIG. 3A is a cross-sectional view of the horizontal injection well taken about lines 3A—3A of FIG. 1;

FIG. 3B is a cross-sectional view of the soil remediation system taken about lines 3B—3B of FIG. 1;

FIG. 3C is a cross-sectional view of the soil remediation system taken about lines 3C—3C of FIG. 1.

DETAILED DESCRIPTION OF THE PREFERRED EMBODIMENT

Figure 1:
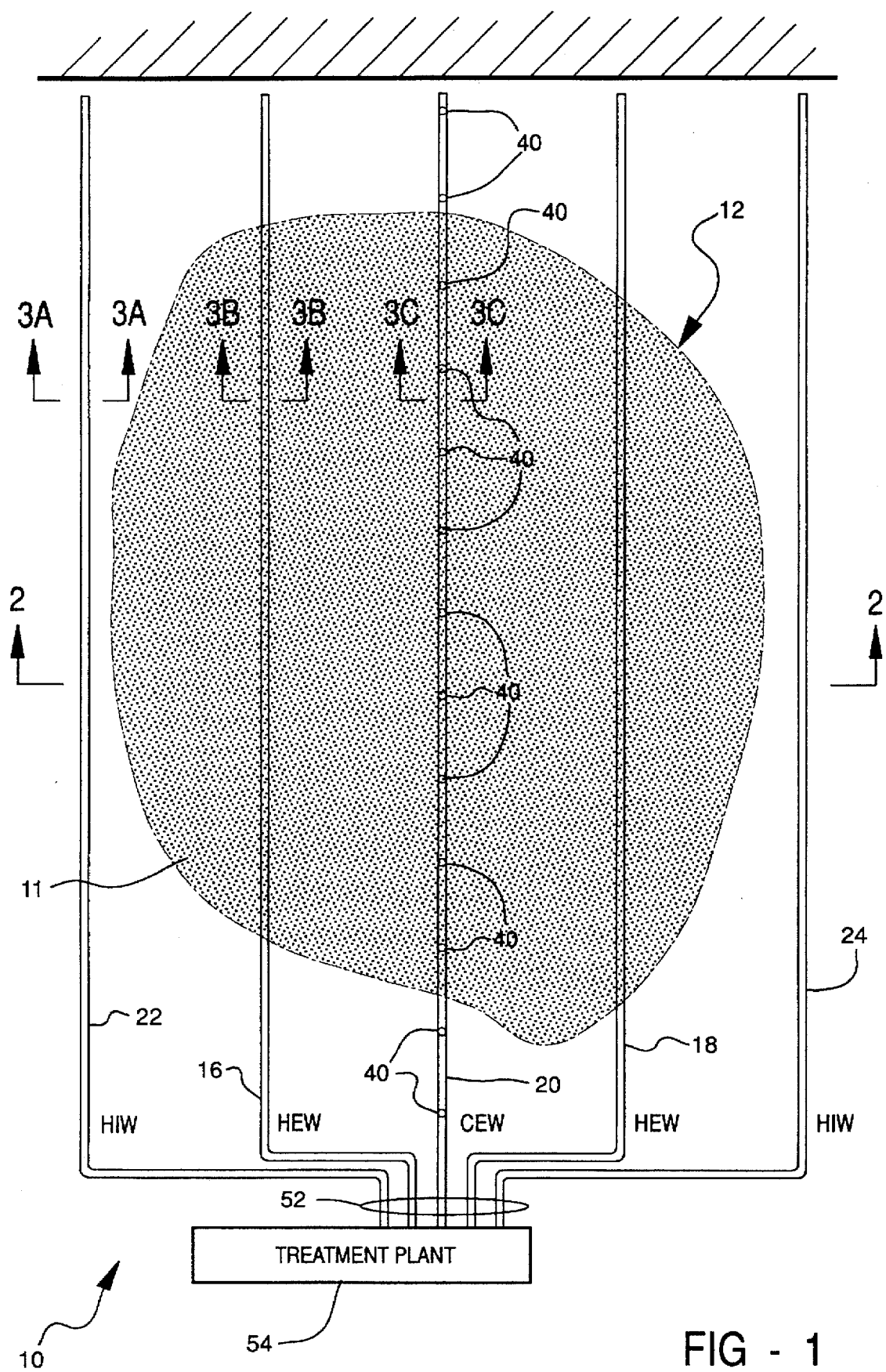
FIG. 1 is a top view of an example of the soil remediation system of the present invention.
Figure 2:
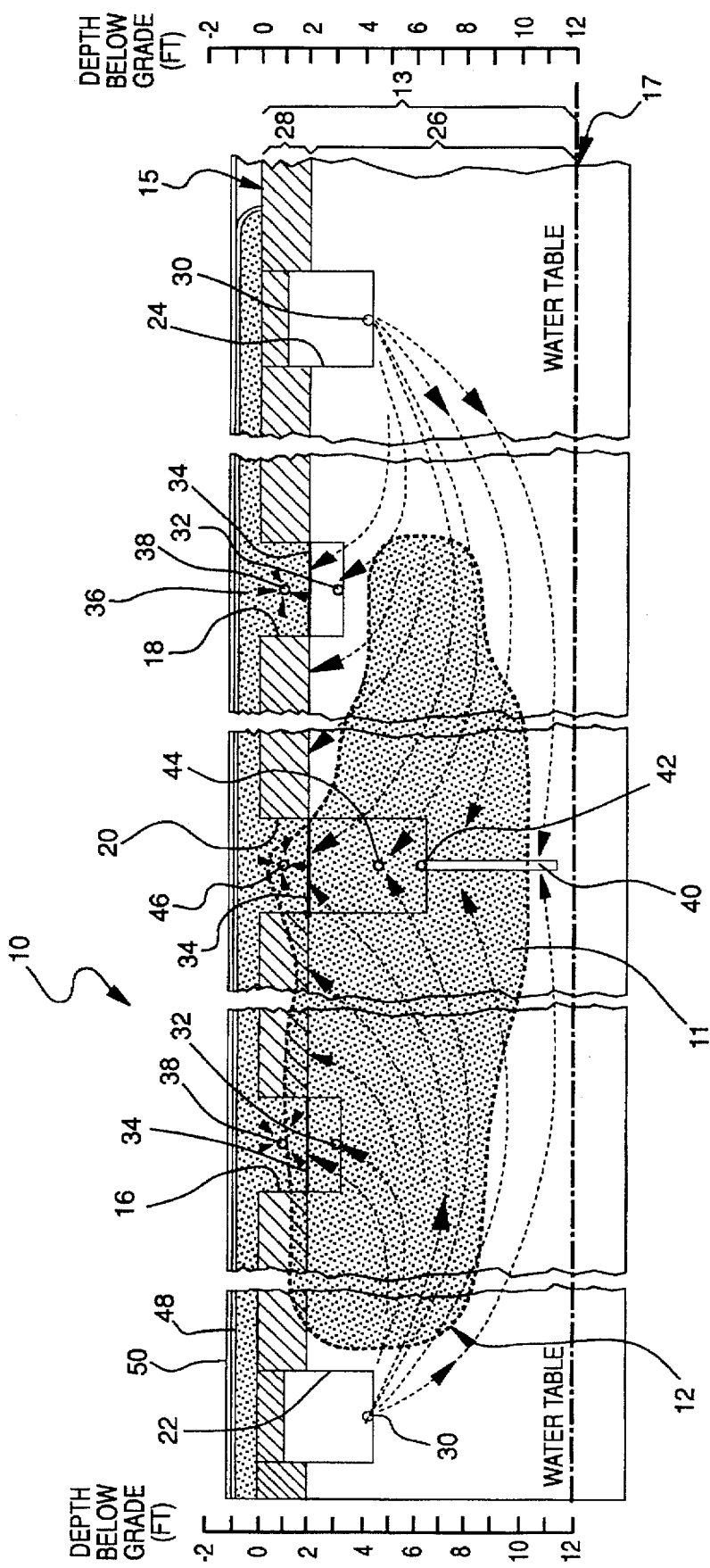
FIG. 2 is a cross-sectional view of an example of the soil remediation system taken about line 2—2 of FIG. 1.

Referring to FIGS. 1 and 2, the soil remediation system 10 of the present invention is shown. FIGS. 1 and 2 depict a contaminated area 12 consisting of contaminates 11 located in the vadose zone 13 in the earth between the surface of the earth 15 and a subsurface water table 17. The contaminates 11 can be aliphatic and/or aromatic hydrocarbons, halogenated hydrocarbons, or other volatile and semi-volatile organic, inorganic and organometallic compounds. Many of these compounds have vapor pressures of at least 20 mmHg at room temperature and accordingly can easily be removed when subjected to a suitable air flow that disturbs the vapor pressure equilibrium state of the contaminants. The soil remediation system 10 comprises at least one extraction well. Extraction well may be of the horizontal or vertical type. In other words, the extraction well may extend horizontally across the vadose zone 13 substantially parallel to the water table 17 or vertically into the vadose zone 13 substantially perpendicular or towards the water table 17. In the preferred embodiment, the soil remediation system 10 comprises a first horizontal extraction well 16, a second horizontal extraction well 18, a combination horizontal and vertical extraction well 20, a first horizontal injection well 22, and a second horizontal injection well 24. The extraction wells 16, 18 and 20 are used to pull air or a like gaseous fluid from the vadose zone 13 to the surface of the earth 15.

First and second horizontal injection wells 22, 24 are used to inject or push air or a like gaseous fluid from the surface of the earth 15 into the vadose zone 13. In this manner, the air or like gaseous fluid is circulated from the surface of the earth 15 into and through injection wells 22, 24, into and through the contaminated area 12 of the vadose zone 13, into and through the extraction wells 16, 18, 20 and back to the surface of the earth 15. As the air or the like gaseous fluid is circulated in this manner, the vapor pressure equilibrium of the contaminants 11 is disturbed such that the contaminants 11 have a higher vapor pressure than the surrounding medium causing the contaminants 11 to vaporize. Both naturally occurring and induced vapors are then removed by the air current flowing through the vadose zone and transported to the surface of the earth 15. The use of injection wells and vacuum extraction wells to remove contaminants from the vadose zone of the earth is well known as disclosed in the following United States patents, the teachings of which are incorporated herein by reference: U.S. Pat. No. 4,593,760, Reissue Pat. No. 33,102, U.S. Pat. No. 4,730,672, and U.S. Pat. No. 5,161,914. The present invention addresses the problem of removing contaminants when the vadose zone consists of two or more stratigraphic compositions, zones or layers wherein each stratigraphic composition has a different pneumatic conductivity and/or consists of two or more contaminants having varying equilibrium vapor pressures and/or concentrations. For illustrative purposes, the vadose zone 13 consists of a first zone or layer 26 of earth having a first pneumatic conductivity and second zone or layer 28 of earth having a second pneumatic conductivity. For example, the first zone 26 consists of sand while the second zone 28 consist of clay. The first sand zone 26 has a relatively higher pneumatic conductivity then the second clay zone 28 and thus a gas can flow easier through the first sand zone 26 than the second clay zone 28.

Although not depicted, the first zone 26 could consist of a first contaminant having a first vapor pressure and the second zone 28 could have a second contaminant having a second vapor pressure either in addition to, or without the first 26 and second 28 zones having different pneumatic conductivities. Again, for illustrative purposes, the first zone 26 extends from a level two feet below the surface of the earth 15 to the water table 17 which is approximately 12 feet below the surface of the earth 15. The second clay zone 28 extends from the surface of the earth 15 to approximately two feet below the surface of the earth 15.

As will be understood from FIGS. 2 and 3A, the horizontal injection wells 22, 24 are constructed by digging trenches of approximately five feet deep but varying in depths depending on strata, one to five feet in width, and having lengths greater than the contaminated area 12. The injection wells 22, 24 are positioned at the outer perimeter of the contaminated area 12. After the trenches are dug, injection well pipes 30 are laid along the lengths thereof. The injection well pipes 30 have perforations therein and are wrapped with a knitted polyester sock or similar geotextile material such as that disclosed in U.S. Pat. No. 4,815,892, the teachings of which are incorporated herein by reference. The knitted polyester sock or similar geotextile material prevents the infiltration of the sand from the first zone 26 through the perforations of pipes 30 while allowing the air or other gaseous fluid to pass there through. The pipes 30 are thus horizontally placed within the injection wells 22, 24 relative to the water table 17. The native sand is recompacted in the trenches established for the injection wells 22, 24 up to approximately one foot below the surface of the earth 15 and then is recompacted with low permeability soils or similar engineered materials placed into the holes of the injection well trenches 22, 24 up to the surface of the earth 15. The low permeability soils or similar engineered materials from the second layer 28 act as a fluid flow barrier so that any air injected into the perforated pipes 30 does not escape above the surface of the earth 15 unless removed by extraction wells 16, 18, 20.

As will be understood from FIGS. 2 and 3B, the trenches for the horizontal extraction wells 16, 18 are then dug. The trenches for the horizontal extraction wells 16, 18 are positioned between the pair of horizontal injection wells 22, 24 in a spaced apart relationship therewith. The trenches for the extraction wells 16, 18 are dug approximately three feet below the surface of the earth with a width of approximately one to five feet and a length approximately the same as the length of the trenches dug for the horizontal injection wells 22, 24. First horizontal extraction pipes 32 having perforations therein and also wrapped with knitted polyester or similar geotextile material or equivalent are laid within the trenches established for each horizontal extraction well 16, 18 and approximately one foot layer of sand is then recompacted on top of the pipes 32. Next, a zero or low permeability membrane, e.g., a plastic layer, such as polyvinyl chloride (PVC), bentonite panels or similar engineered materials or sheeting 34, is then laid within the trenches of the extraction wells 16, 18 such that the low permeability membrane/layer 34 extends across the width of the trenches of the extraction wells 14, 16, 18 and along the length thereof. The low permeability membrane/layer 34 prevents and/or substantially retards any fluid flow between the first sand zone 26 and the second clay zone 28. In other words, the impermeable or low permeability membrane/layer 34 isolates the first zone 26 from the second zone 28 to retard commingling of any gases flowing through the respective zones 26, 28. A one foot layer of washed pea stone 36 is then placed in the trenches of the extraction wells 16, 18. Second extraction well pipes 38 having perforations therein and also wrapped with knitted polyester material or similar geotextile material is laid in each extraction well 16, 18 on top of the layer of pea stone 36 and are then covered with approximately another one foot layer of pea stone 36. The first extraction well pipes 38 are independent of the second extraction well pipes 32 are not in fluid communication with second extraction well pipes 38.

As will be understood from FIGS. 2 and 3C, an example of a combination extraction well 20 is positioned between the first extraction well 16 and the second extraction well 18 and includes a trench dug approximately seven feet below the surface of the earth 15 approximately one to five feet wide and extending a length substantially equal to the lengths of the injection wells 22, 24 and extraction wells 16, 18. Bore holes are then drilled at spaced intervals from the bottom of the trench of the combination extraction well 20 to the water table 17. A plurality of pipes or well casings 40 having open slots, or perforations therein and wrapped with a knitted polyester sock or a similar geotextile material, is then vertically positioned within each bore hole. In other words, the combination extraction well piping casing is vertically placed relative to the water table 17. A header pipe 42 is connected to and in flow communication with each slotted perforated pipe 40 and extends horizontally along the bottom of the trench for the combination extraction well 20. A two foot layer of sand is then compacted at the bottom of the trench for the combination extraction well 20 upon which a second PVC pipe 44 having perforations therein is horizontally placed. Again, pipe 44 is wrapped with a knitted polyester sock or a similar geotextile material to prevent the infiltration of sand into the perforations of the pipe 44. Approximately a three foot layer of sand is then covered over the pipe 44 upon which a layer of impermeable membrane PVC sheeting 34 is laid to prevent fluid flow communication between the first zone 26 and the second zone 28. A one foot layer of pea stone 36 is then laid into the trench for the extraction well 20 and on top of the impermeable membrane 34. Next, a third perforated pipe 46 is horizontally placed within the combination extraction well 20 trench. Finally, a highly permeable layer composed of pea stone or an engineered material such as geonet or geotextile 36 is used to cover up the pipe 46 and create a one foot layer above the surface of the earth 15. The pipes 40, 42 and 44 are independent of, i.e. not in fluid communication with, the pipe 46.

A fluid flow restriction or control membrane 48 such as perforated PVC, high-density polyethylene, spun-bound olefin, or micro-porous, PTFE sheeting may be used to cover all of the wells 16, 18, 20, 22 and 24 and is laid on top of the layer of pea stone 36 disbursed on top of the surface of the earth 15. The membrane 48 has a lower permeability relative to the permeability of the second zone or layer 28 of earth, e.g. clay, such that gas can be pulled through the pipes 38 and 46 of extraction wells 16, 18, 20 and through the pea stone 36 and clay, as well as from the atmosphere of the earth, at controlled flow rates from each medium. In other words, membrane 48 isolates the pipes 38 and 46 from the atmosphere of the earth.

A protective cover 50 made from HDPE sheeting is then laid upon the membrane 48. The protective cover 50 protects the membrane 48 from ultra-violet light deterioration and prevents storm water from infiltrating the ground beneath the membrane 48. Preferably, the membrane 48 and protective cover 50 do not allow excessive quantities of air to flow from the atmosphere to the first and second zones 26, 28 of the earth.

Figure 4:
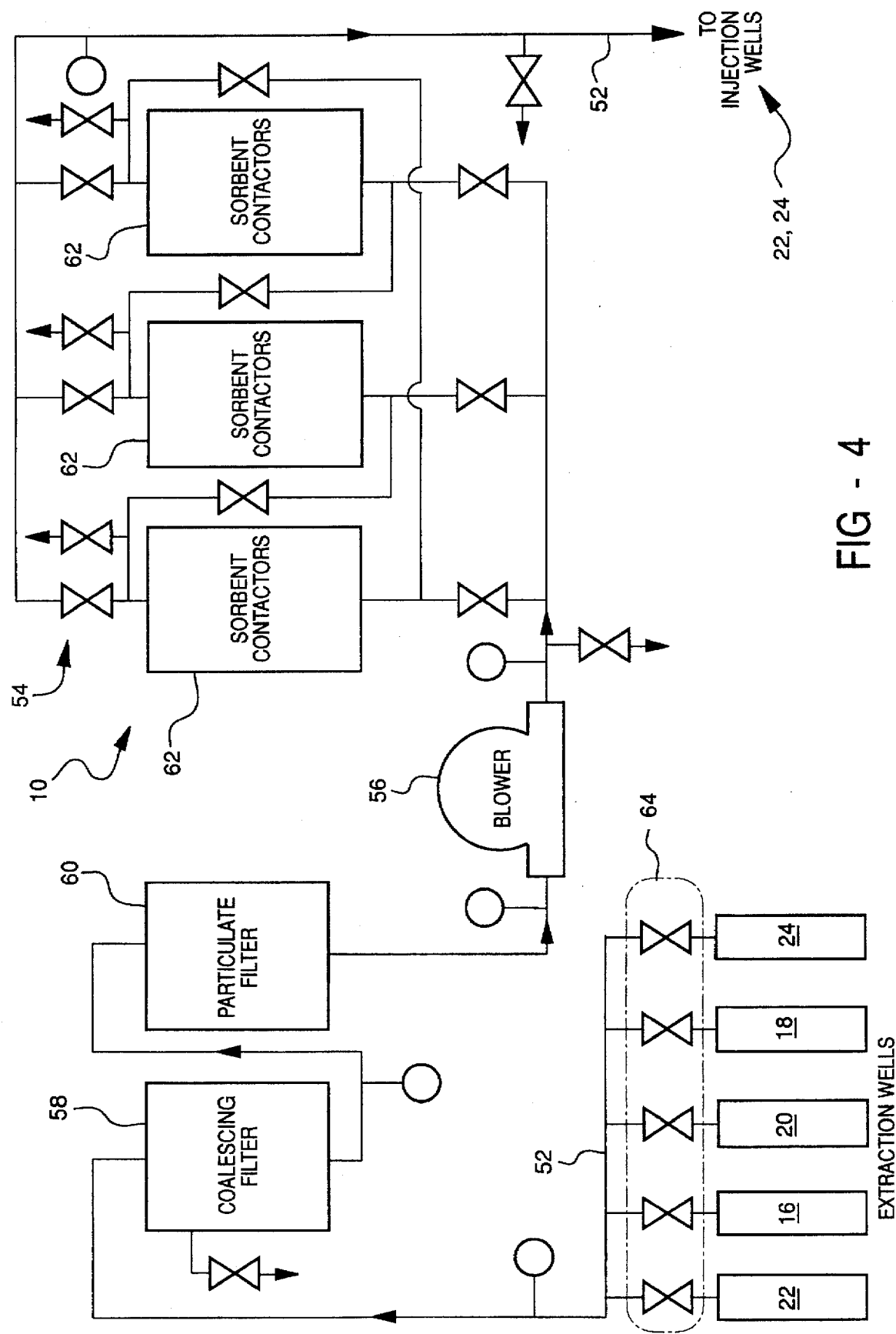
FIG. 4 is a schematic diagram of the soil system of the present invention.

The horizontal injection wells 22, 24 and horizontal extraction wells 16, 18, 20 are connected into and in flow communication with a blower and treatment plant system 54 located on top of the surface 15 of the earth by a series of transmission pipes 52. A schematic diagram of the treatment plant 54 is disclosed in FIG. 4. The treatment plant 54 includes a blower 56 which is used to push air into the injection wells 22, 24 and extract air from the extraction wells 16, 18, 20 to create a closed looped system which circulates air through the vadose zone 13 from the injection wells 22, 24 to the extraction wells 16, 18, 20 to the treatment plant 54 for neutralization and back to the injection wells 22, 24. The blower 56 can comprise a fan driven by either a electric or gasoline engine. The rotation rate of the fan can either be fixed or variable to provide a volumetric flow rate sufficient to withdraw and remove the contaminants 11 from the vadose zone 13.

The plant 54 includes filters 58 and 60 for collecting contaminants from the wells as well as sorbent contractors 62 for condensing the contaminant vapors. The blower and treatment system 54 further includes a valve and/or blowers 64 for independently controlling the volumetric air extraction flow rate from the first zone 26 via pipes 32, 40 and 44 and through the second zone 28 via pipes 38 and 46. Additionally, valves and/or blowers can be provided for independently controlling the injection volumetric flow rate of air through pipes 30.

Preferably, system 10 provides a first circulation means comprising pipes 30, 32, 40, 44, transmission pipes 52, blowers 56, and valves 64 for circulating air through the first zone 26 at a first volumetric flow rate and a second circulation means comprising pipes 38, 46, transmission pipes 52, blowers 56, and valves means 64 for circulating air through the second zone 28 at a second volumetric flow rate. The present invention can be practiced utilizing a single extraction well 16. In this case, the first circulation means includes pipe 32, a single transmission pipe 52, blower(s) 56, and valve(s) 64 and second circulation means includes pipe 38, a single transmission pipe 52, blower(s) 56, and valve(s) 64.

It is a critical aspect of this invention to provide a low or zero permeability barrier 34 to prevent fluid flow communication between the first 26 and second 28 zones so that the volumetric flow rate of air through each zone can be independently controlled. In other words, a low permeability layer 34 isolates the first zone 26 from the second zone 28 to prevent the commingling of the first and second volumetric flow rates so as to allow removal of contaminates in the first zone 26 independent of the removal of contaminates in the second zone 28. Referring to FIG. 2, the dotted lines and arrows depict the direction of air flow representing the first volumetric flow rate in the first zone 26 whereas the arrows without trailing dotted lines depict the direction of air flow representing the second volumetric flow rate in the second zone 28. The zero or low permeability barrier 34 could consist of naturally occurring subsurface layer of soil such as clay or other engineered materials which are of zero or low permeability.

In operation, systems 10 removes contaminants from the vadose zone 13 consisting of two or more layers 26, 28 having different pneumatic conductivities and/or two or more contaminants having different room temperature vapor pressures and/or concentrations located in different layers, or zones 26, 28 or depths of the earth at a predetermined rate with the least amount of energy consumed.

The present invention includes a method for removing contaminates from the contaminated area 12 of the earth located in the vadose zone 13 between the surface of the earth 15 and the subsurface water table 17 and comprising the first zone 26 and the second zone 28 adjacent to the first zone 26. The method comprises the steps of circulating gas, such as air through the first zone 26 at a first volumetric flow rate, circulating gas, such as air, through the second zone 28 at a second volumetric flow rate, and isolating the first zone 26 from the second zone 28 to control the commingling of the first and second volumetric flow rates. The method further includes the step of isolating the first and second zones 26, 28 by placing a low permeability membrane/layer 34 there between. In accordance with the present invention the first and second volumetric flow rates may be independently adjusted to account for specific contaminants, concentrations, and/or pneumatic conductivity conditions existing in the first and second zones or layers 26, 28 of the earth.

The invention has been described in an illustrative manner, and it is to be understood that the terminology which has been used is intended to be in the nature of words of description rather than of limitation.

Obviously, many variations and modifications are possible in light of the above teachings. It is, therefore, to be understood that within the scope of the appended claims wherein reference numerals are merely for convenience and are not to be in any way limiting, the invention may be practiced otherwise that as specifically described.

What is claimed is:

1. A method for removing contaminates from a contaminated area (12) of the earth located in the vadose zone (13) between the surface of the earth (15) and the subsurface water table (17) and comprising a first zone (26) having a first composition and a second zone (28) adjacent to the first zone (26) and having a second composition different from the first composition, said method comprising the steps of:

circulating gas through the first zone (26) at a first volumetric flow rate;

circulating gas through the second zone (28) at a second volumetric flow rate; and characterized by isolating the first zone (26) from the second zone (28) to retard the commingling of the first and second volumetric flow rates so as to allow removal of contaminates in the first zone (26) independent of the removal of contaminates in the second zone (28).

2. A method as set forth in claim 1 further defined by isolating the first and second zones (26, 28) by placing a low permeability layer (34) therebetween.

3. A method as set forth in claim 2 further defined as placing an impermeable layer (34) of plastic between the first and second zones (26, 28).

4. A soil remediation system (10) for removing contaminates (11) from the vadose zone (13) of the earth, said system (10) comprising:

a contaminated area (12) located in the vadose zone (13);

a first zone (26) having a first composition located in said contaminated area (12);

a second zone (28) located in said contaminated area (12) and adjacent to said first zone (26) and having a second composition different from said first composition;

first circulation means (32) for circulating gas through said first zone (26) at a first volumetric flow rate;

second circulation means (38) for circulating gas through said second zone (28) at a second volumetric flow rate; and characterized by isolation means (34) for isolating said first zone (26) from said second zone (28) to control commingling of said first and second volumetric flow rates so as to allow removal of contaminates in said first zone (26) independent of the removal of contaminates in said second zone (28).

5. The soil remediation system (10) of claim 4 wherein said isolation means (34) further comprises a low permeability layer (34) positioned between said first and second zones (26, 28).

6. The soil remediation system (10) of claim 5 wherein said layer (34) is selected from the group consisting of fine-grained soil and plastic sheet.

* * * * *